Patented Aug. 24, 1937

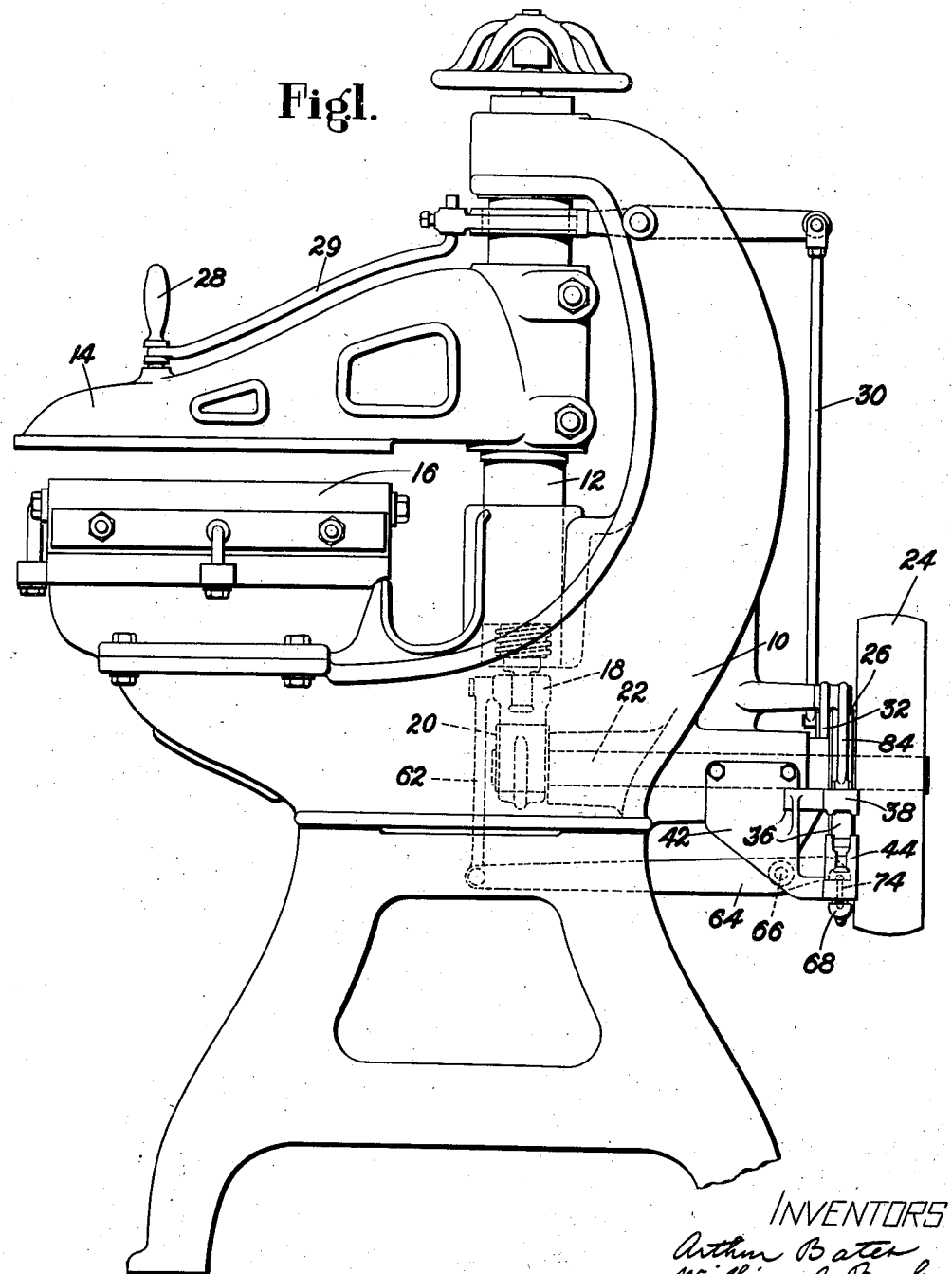

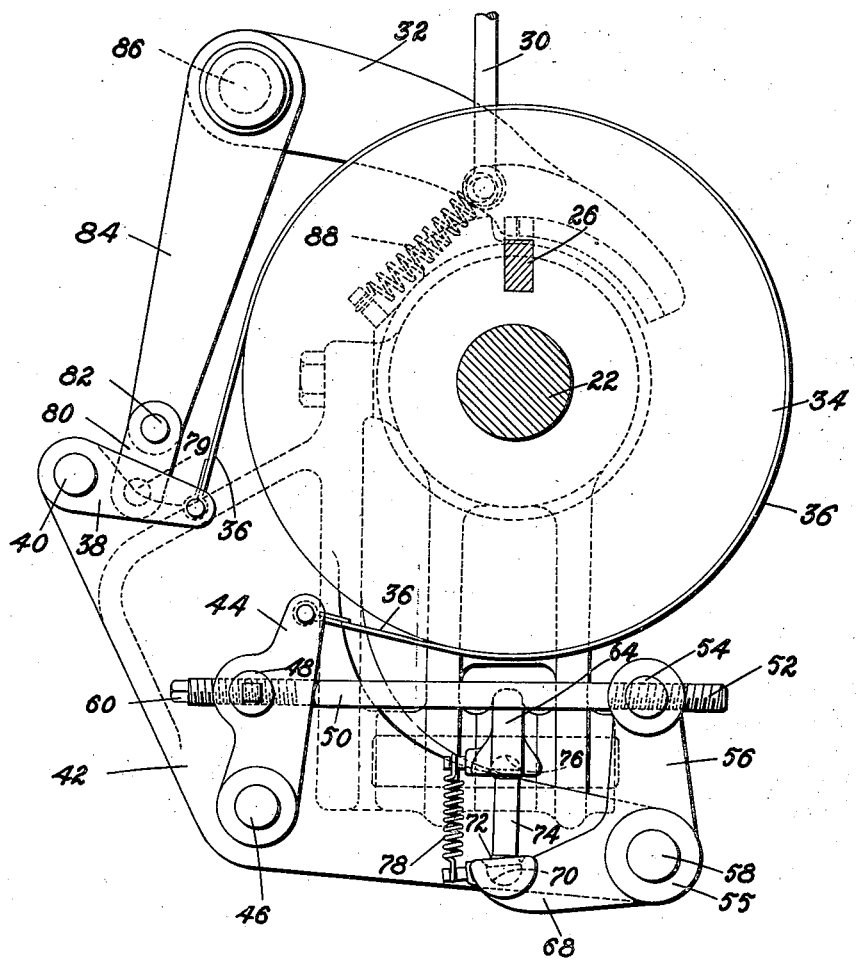

2,090,661

UNITED STATES PATENT OFFICE 2,090,661

STARTING AND STOPPING MECHANISM

Arthur Bates and William Arthur Barker, Leicester, England, assignors to United Shoe Machinery Corporation, Paterson, N. J., a corporation of New Jersey Application October 26, 1936, Serial No. 107,638
In Great Britain December 4, 1935

3 Claims. (Cl. 192—17)

This invention relates to starting and stopping mechanisms and is herein illustrated as embodied in a clicking machine of the type disclosed in United States Letters Patent No. 921,503, granted May 11, 1909, upon an application filed in the name of Arthur Bates. It will be understood, however, that the present invention is not limited to machines of the type referred to but is adapted to use in connection with machines of other types.

An object of the invention is to provide improved starting and stopping mechanism for machines of the type referred to which is especially adapted to release braking means prior to initiation of power operation of the machine and which, at the same time, is simple in its construction and effective in its operation.

To this end and as illustrated, we have provided in a machine comprising a drive shaft and clutch for operatively connecting the shaft to power means, a brake drum upon the shaft, a brake band extending around the drum and having its ends connected to two pivotally mounted levers, one of which is arranged to be operated in response to operation of the shaft to tighten the brake band at the end of a cycle of operation of the machine, and the other of which is provided with a toggle connection normally operative to hold the end of the band to which it is connected in fixed position but operable to slacken the tension in the brake band as the clutch is engaged.

The construction as above outlined is advantageous in that the mechanism for slackening and tightening the brake band about the drum is readily operable at definite points in the cycle of operation of the machine to release the brake band prior to initiation of operation of the machine, thereby avoiding the driving of the machine against the action of the brake as the machine is started, and to tighten the brake band at the end of a single rotation of the shaft. Furthermore, this result is obtained by use of a comparatively small number of operating parts, thus contributing to economy in the manufacture and maintenance of the machine.

These and other features of the invention are disclosed in the accompanying drawings, described in the following detailed specification and are pointed out in the claims.

Fig. 1 is a side elevation of a clicking machine embodying one form of our invention, and Fig. 2 is an end view partly in section showing the mechanism for operating the brake.

The invention is illustrated as embodied in a clicking machine of the type disclosed in United States Letters Patent No. 950,986, granted March 1, 1910, upon an application filed in the name of Arthur Bates. As shown in Fig. 1, the machine comprises a frame 10, having slidably mounted therein a vertical spindle 12 carrying a presser arm 14 arranged for movement toward and away from a cutting block 16 in producing pressure applying operations upon freely movable cutting dies which can be positioned upon material extending over the surface of the block. The spindle 12 is reciprocated by an eccentric strap 18 secured to the lower end of the spindle and making connection with an eccentric 20 upon a rotatable shaft 22 arranged to be connected to a flywheel 24 by means of a clutch 26, the operation of the clutch being initiated by a starting handle 28 connected through links 29 and 30 to a clutch control member 32 (Fig. 2). The clutch is preferably of the one-revolution type, that is, the clutch is disengaged at the end of a single revolution of the shaft and thereafter the shaft 22 is brought to rest by means of a brake.

As shown, the brake comprises a drum 34 secured to the shaft 22 and around which extends a brake band 36. One end of the brake band is connected to an end of a forked lever 38 pivotally mounted at 40 on a bracket 42 secured to the frame 10.

The other end of the brake band is connected to a forked lever 44, the lower end of which is secured to a spindle 46 rotatably mounted in the bracket 42.

The mechanism for applying tension to the brake band will now be described. The lever 44 has rotatably mounted in it a horizontal stud 48 substantially parallel to the spindle 46 and has extending through it a threaded bore in which is positioned a horizontal rod 50. The rod 50 extends laterally below the drum 34 and has a threaded end 52 which extends through a pin 54 carried by an arm 56 of a bell-crank lever 55 which is pivotally mounted at 58 upon the frame. One end of the rod is squared off as shown at 60 to provide tool engaging means for turning the rod to adjust the relative positions of the studs 48 and 54. The threads at the opposite ends of the rod are, respectively, right- and left-handed screw threads with the result that rotation of the rod will result in the movement of the lever 44 and the lever arm 56 toward or away from each other thereby providing means by which the tension upon the brake band 36 can be adjusted.

Preferably, the brake band is applied at a point in the cycle at which the spindle 12 is in its elevated position. To this end there is provided a link 62 extending downwardly from the eccentric strap 18 and making pivotal connection at its lower end with a lever 64 pivotally mounted upon the frame at 66 and arranged to engage connections for effecting rotation of the arm 56. The bell-crank lever 55 has an arm 68 which extends substantially horizontally of the machine and is positioned directly below the drive shaft 22. The end of the arm 68 has formed in its upper face a recess 70 in which is seated a rounded lower end 72 of a rod 74, the upper end of which is engaged in a recess 76 in the outer end of the lever 64. A tension spring 78 connecting the arm 68 of the bell-crank lever and the end of the lever 64 serves to retain the rounded ends of the rod 74 seated in the recesses 70 and 76.

The mechanism thus far described is such that when the spindle 12 is raised in lifting the presser arm 14, as it reaches the highest position it will exert a pull through the bell-crank lever 55, rod 59 and lever 44 on the lower end of the brake band 36 to tighten the brake band around the drum 34. By rotation of the rod 50 the lever 44 to which the end of the brake band is connected may be adjusted to tighten the band around the member 34 if wear between the band and the member takes place or in initially assembling the parts.

The lever 38 is so positioned in the machine relatively to the lever 44 that the brake band has engagement with the drum 34 for about three-quarters of the circumference of the drum. In order to provide for the release of the brake band prior to initiating an operation of the clutch and rotation of the shaft the lever 38 has pivotally connected to it, between its ends at 79, the lower end of an upwardly extending toggle link 80. The upper end of the link is pivotally connected at 82 to the lower end of an arm 84 secured upon the horizontal shaft 86 which is rotatably mounted in the frame. The clutch control lever 32 is also secured to the shaft 86. The clutch control lever can be actuated by the operator to cause the clutch to be closed and the drive shaft 22 to make a single revolution. When so actuated the clutch lever 32 which extends from the shaft 86 over the driven shaft 22 is raised, but during the cycle is automatically returned to its lowermost position by a spring 88, after which it causes the clutch to be opened at the end of a single rotation of the shaft. When the clutch lever is in its lowermost position the toggle formed by the link 80 and the arm 84 is straightened, which serves to hold the lever 38 and the end of the brake band connected thereto in fixed position. However, as the clutch lever is raised to initiate operation of the clutch the arm 84 is swung toward the drive shaft and breaks the toggle thus allowing the brake band 36 to slacken on the drum and to relieve the braking pressure between the band and the drum. Since the relieving of the braking pressure occurs during the upward movement of the clutch lever 32 during which the clutch operation is initiated and occurs before the rotation of the shaft commences, the shaft is therefore free to rotate without any drag of the brake. As the drive shaft rotates the forward end of the lever 64 is lowered, permitting the spring 78 to move the lever 44 in a direction to cause slackening of the brake band. Also during the first half of the revolution of the shaft the clutch lever is automatically allowed to drop to its lowermost position in readiness to disengage the clutch at the end of a single revolution of the shaft. However, when the clutch lever drops the toggle 80, 84 is straightened without applying the brake which is possible because the brake band is at this time in slack condition. The straightening of the toggle holds the end of the brake band connected to the lever 38 against movement when during the upward movement of the spindle 12 the brake band is drawn against the drum 34 by the action of the lever 64 which through members 74, 56, and 50 effects movement of the lever 44 outwardly from the drum 34.

Thus it will be seen that we have provided comparatively simple mechanism by which the drag of the brake band upon the brake drum is released prior to the initiation of rotation of the shaft and for tightening the band at the end of a single revolution thereof.

Having described our invention, what we claim as new and desire to secure by Letters Patent of the United States is:

1. Starting and stopping mechanism for machines comprising a frame, a rotary shaft, a brake drum upon the shaft, a brake band extending around the drum, a pair of levers pivotally mounted upon the frame and to which the ends of the brake band are respectively connected, means operable in response to rotation of the shaft for causing one of the levers to tighten the brake band around the drum at the end of a single revolution of the shaft, means for normally holding the other lever in fixed position, manually operable means for initiating rotation of the shaft, and means operable in response to operation of the last mentioned means for moving the second-mentioned lever in a direction to slacken the tension upon the brake band thereby avoiding driving of the machine against the action of the brake as the machine is started.

2. Starting and stopping mechanism for a machine comprising a frame, a shaft rotatably mounted in the frame, a flywheel mounted upon the shaft, a clutch for operatively connecting the shaft to the flywheel, a brake drum carried by the shaft, two pivotally mounted levers carried by the frame, a brake band extending around the brake drum and having its ends secured to the levers, a manually-controlled starting lever pivotally mounted upon the frame, a toggle link connecting the last-mentioned lever with one of said pivotally mounted levers and normally operable to hold one end of the brake band in fixed position, and a member operable in response to rotation of the shaft for moving the other pivotally mounted lever in a direction to tighten the band about the drum.

3. Starting and stopping mechanism for machines comprising a frame, a shaft rotatively mounted in the frame, a flywheel loosely mounted upon the shaft, a clutch member for securing the flywheel to the shaft, a spindle slidably mounted in the frame, an eccentric upon the shaft for reciprocating the spindle in a heightwise direction, a brake drum upon the shaft, two levers pivotally mounted upon the frame, a brake band passing around the brake drum and having its ends connected to the levers, a bell-crank lever pivotally mounted upon the frame and having an arm operable to effect operation of the clutch and a second arm extending adjacent to one of the brake band supporting levers for normally holding one end of the brake band in fixed position, and a lever operatively connected to the spindle and to the other brake band supporting lever operable upon a single revolution of the shaft to tighten the brake band about the drum.

ARTHUR BATES.
WILLIAM ARTHUR BARKER.